US008392039B2

(12) United States Patent
He et al.

(10) Patent No.: US 8,392,039 B2
(45) Date of Patent: Mar. 5, 2013

(54) METHOD AND SYSTEM DISPLAYING CROSSWIND CORRECTION FOR APPROACH TO A RUNWAY

(75) Inventors: Gang He, Morristown, NJ (US); Ivan Sandy Wyatt, Scottsdale, AZ (US)

(73) Assignee: Honeywell International Inc., Morristown, NJ (US)

( * ) Notice: Subject to any disclaimer, the term of this patent is extended or adjusted under 35 U.S.C. 154(b) by 764 days.

(21) Appl. No.: 12/129,495

(22) Filed: May 29, 2008

(65) Prior Publication Data
US 2009/0326744 A1 Dec. 31, 2009

(51) Int. Cl.
*G05D 1/08* (2006.01)
(52) U.S. Cl. ............................................ 701/14; 701/10
(58) Field of Classification Search ................. 701/3, 4, 701/10, 14, 16–18; 340/967, 968, 971–976, 340/979, 980, 966; 244/75.1, 76 R, 174, 244/175, 181, 182, 194, 195; 345/428, 581, 345/589, 600, 698, 12, 20, 63
See application file for complete search history.

(56) References Cited

U.S. PATENT DOCUMENTS

| | | | | |
|---|---|---|---|---|
| 4,040,005 A | * | 8/1977 | Melvin | 340/973 |
| 4,167,735 A | * | 9/1979 | Lewis | 342/33 |
| 4,326,189 A | * | 4/1982 | Crane | 340/973 |
| 4,368,517 A | * | 1/1983 | Lovering | 701/16 |
| 5,060,889 A | * | 10/1991 | Nadkarni et al. | 244/183 |
| 5,289,185 A | * | 2/1994 | Ramier et al. | 340/971 |
| 5,369,589 A | * | 11/1994 | Steiner | 701/200 |
| 5,593,114 A | * | 1/1997 | Ruhl | 244/183 |
| 5,745,054 A | * | 4/1998 | Wilkens | 340/972 |
| 6,243,649 B1 | | 6/2001 | Wetherbee et al. | |
| 6,320,579 B1 | * | 11/2001 | Snyder et al. | 345/419 |
| 6,647,774 B1 | | 11/2003 | Youngquist | |
| 7,170,518 B1 | * | 1/2007 | Millington et al. | 345/428 |
| 7,218,245 B2 | * | 5/2007 | Wyatt et al. | 340/973 |
| 7,287,332 B2 | * | 10/2007 | Dworman | 33/1 SD |
| 7,689,326 B2 | * | 3/2010 | He | 701/3 |
| 8,055,395 B1 | * | 11/2011 | Dirks et al. | 701/16 |
| 2003/0193411 A1 | * | 10/2003 | Price | 340/973 |

(Continued)

FOREIGN PATENT DOCUMENTS

EP    1016851 A1    7/2000

OTHER PUBLICATIONS

EP Search Report dated Oct. 21, 2009, EP 09161151.7-2206.

(Continued)

*Primary Examiner* — Khoi Tran
*Assistant Examiner* — Jason Holloway
(74) *Attorney, Agent, or Firm* — Ingrassia Fisher & Lorenz, P.C.

(57) ABSTRACT

An aircraft display system (100) for illustrating a suggested crab angle has a processor (104) adapted to receive data representative of a desired ground tract (214) and representative of a ground tract deviation, and is configured upon receipt of these data to supply a ground tract rendering display command. A display device (116) coupled to receive the ground tract image rendering display commands is operable to render an icon (222) representative of the desired aircraft heading to maintain the desired ground tract (214). The method of how to maneuver an aircraft to correct for crosswind includes determining (306) a difference between a current ground track (224) and a current heading (218), determining a desired heading to maintain the desired ground track (214) based on the difference, and rendering on a display an aircraft icon (222) that is representative of the desired heading.

17 Claims, 3 Drawing Sheets

U.S. PATENT DOCUMENTS

| | | | |
|---|---|---|---|
| 2003/0205644 A1* | 11/2003 | Najmabadi et al. | 244/195 |
| 2004/0015274 A1* | 1/2004 | Wilkins et al. | 701/3 |
| 2004/0093130 A1* | 5/2004 | Osder et al. | 701/3 |
| 2004/0250616 A1* | 12/2004 | Adebjork et al. | 73/170.02 |
| 2005/0012642 A1* | 1/2005 | Sacle | 340/973 |
| 2006/0177798 A1* | 8/2006 | Dworman | 434/29 |
| 2007/0080828 A1* | 4/2007 | He | 340/974 |
| 2007/0085707 A1* | 4/2007 | Wyatt | 340/979 |
| 2008/0140315 A1* | 6/2008 | Krogh et al. | 701/214 |
| 2010/0185383 A1* | 7/2010 | Kennedy | 701/200 |

OTHER PUBLICATIONS

EP Communication, EP 09161151.7-2206 dated Apr. 5, 2011.

* cited by examiner

METHOD AND SYSTEM DISPLAYING CROSSWIND CORRECTION FOR APPROACH TO A RUNWAY

FIELD OF THE INVENTION

The present invention generally relates to aircraft navigation instrumentation and more particularly to displaying a representation of the crab angle necessary to counteract a crosswind.

BACKGROUND OF THE INVENTION

The approach to landing and touch down on the runway of an aircraft is probably the most challenging task a pilot undertakes during normal operation. To perform the landing properly, the aircraft approaches the runway within an envelope of attitude, course, speed, and rate of descent limits. The course limits include, for example, both lateral limits and glide slope limits. An approach outside of this envelope can result in an undesirable positioning of the aircraft with respect to the runway, resulting in possibly discontinuance of the landing attempt.

In some instances visibility may be poor during approach and landing operations, resulting in what is known as instrument flight conditions. During instrument flight conditions, pilots rely on instruments, rather than visual references, to navigate the aircraft. Even during good weather conditions, pilots typically rely on instruments during the approach to some extent. Many airports and aircraft include instrument landing systems (ILS) to help guide aircraft during approach and landing operations. These systems allow for the display of a lateral deviation indicator to indicate aircraft lateral deviation from the approach course, and the display of a glide slope indicator to indicate vertical deviation from the glide slope.

Typical instrumentation of an aircraft primary flight display shows the heading by an arrow pointing on a compass and may include an aircraft symbol pointing in the direction in which the aircraft is going. The aircraft symbol may be displayed relative to a geometric symbol or set of symbols, to indicate whether the aircraft is left or right of the desired ground tract and above, below, or on the desired glide slope.

Although these known aircraft systems, including those described immediately above, are generally safe, reliable, and robust, these systems do suffer certain drawbacks. For example, if a crosswind is blowing the aircraft off of the desired ground track, the only indication to the pilot is of the aircraft symbol being displaced left or right of the desired ground track. As a result, the pilot may not readily notice the ground tract deviation and may not be timely to maneuver the aircraft (by assuming a crab angle), at least initially, to reduce course deviation due to the crosswind. In other instances, the aircraft is being flown along the desired ground track using ground based ILS but heading of the aircraft is different from this track direction due to crosswind, resulting in a crab condition. The crab angle is the difference between the heading of the aircraft and the ground track of the aircraft necessary to counteract a crosswind. Before an aircraft can be safely landed on a runway, pilot must correct the aircraft heading to align with the track direction for touch down.

Accordingly, it is desirable to provide an aircraft navigation instrumentation system and more particularly to display both the track and heading directions for performing the crosswind landing operations. Furthermore, other desirable features and characteristics of the present invention will become apparent from the subsequent detailed description of the invention and the appended claims, taken in conjunction with the accompanying drawings and this background of the invention.

BRIEF SUMMARY OF THE INVENTION

An aircraft display system is provided for illustrating a crab angle. A processor adapted to receive data representative of a ground track and data representative of current heading is configured upon receipt of these data to supply a rendering display command. A display device coupled to receive the ground tract image rendering display commands is operable to render an icon representative of the current crab conditions for making necessary corrections.

The method of how to maneuver an aircraft to correct for crosswind includes determining a difference between a current ground track and a current heading, determining a desired heading to maintain a desired ground track based on the difference, and rendering on a display an aircraft icon that is representative of the desired heading

BRIEF DESCRIPTION OF THE DRAWINGS

The present invention will hereinafter be described in conjunction with the following drawing figures, wherein like numerals denote like elements.

DETAILED DESCRIPTION OF THE INVENTION

The following detailed description of the invention is merely exemplary in nature and is not intended to limit the invention or the application and uses of the invention. Furthermore, there is no intention to be bound by any theory presented in the preceding background of the invention or the following detailed description of the invention.

Although the examples of embodiments in this specification are described in terms of the currently widely used ILS, embodiments of the present invention are not limited to applications of airports utilizing ILS. To the contrary, embodiments of the present invention are applicable to any runway utilizing a runway assistance landing system (of which ILS is an example) that transmits a signal to aircraft indicating an approach line to a runway. Alternate embodiments of the present invention to those described below may utilize whatever runway assistance landing system signals are available, for example a ground based navigational system, a GPS navigation aid, a flight management system, and an inertial navigation system, to dynamically calibrate and determine a precise approach course to a runway and display the approach course relative to the runway centerline direction to pilots.

Figure 1:
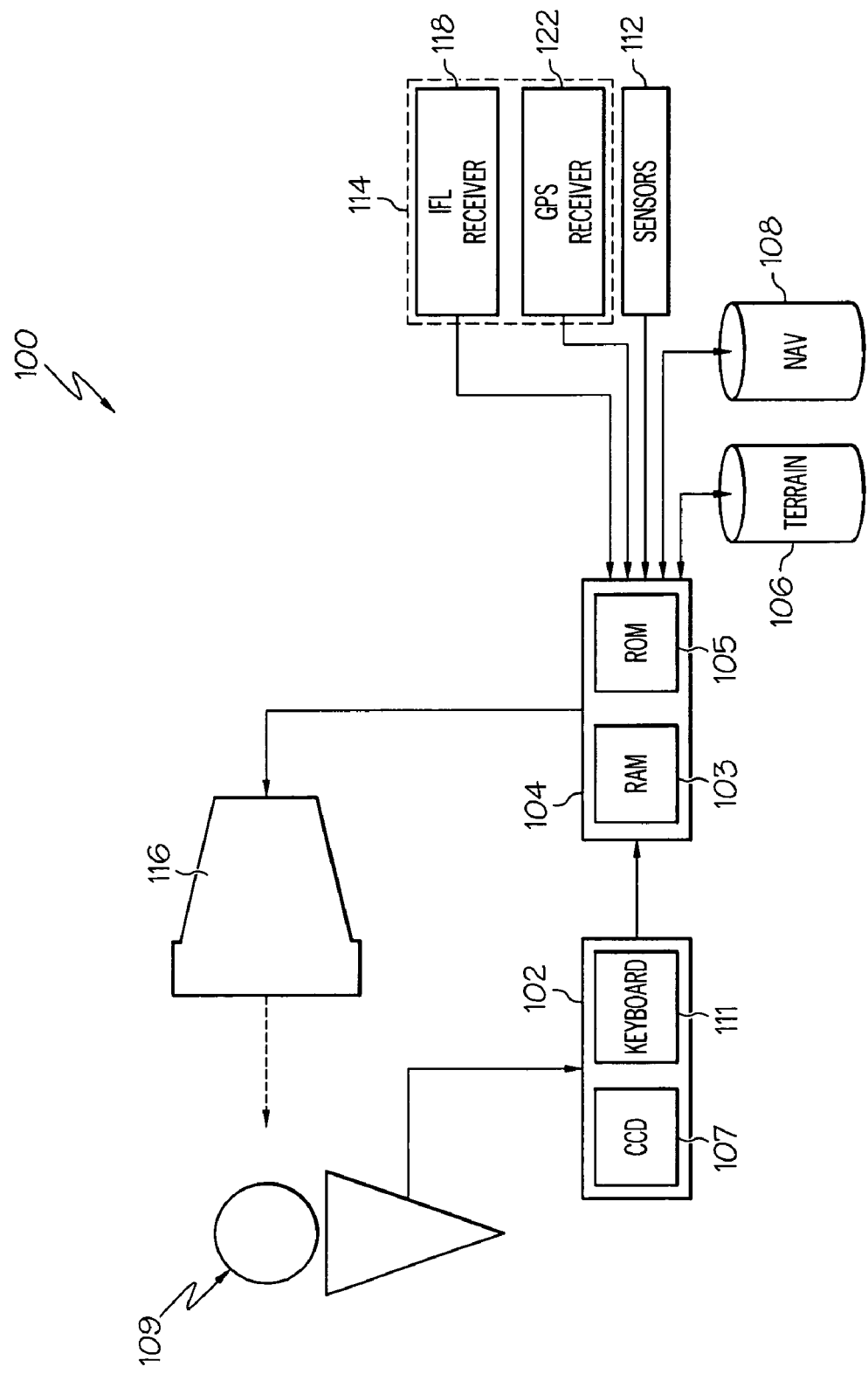
FIG. 1 is a functional block diagram of a flight display system according to an exemplary embodiment.

Referring to FIG. 1, an exemplary flight deck display system is depicted and will be described. The system 100 includes a user interface 102, a processor 104, one or more terrain databases 106, one or more navigation databases 108, various sensors 112, various external data sources 114, and a display device 116. The user interface 102 is in operable communication with the processor 104 and is configured to receive input from a user 109 (e.g., a pilot) and, in response to the user input, supply command signals to the processor 104. The user interface 102 may be any one, or combination, of various known user interface devices including, but not limited to, a cursor control device (CCD) 107, such as a mouse, a trackball, or joystick, and/or a keyboard, one or more buttons, switches, or knobs. In the depicted embodiment, the user interface 102 includes a CCD 107 and a keyboard 111. The user 109 uses the CCD 107 to, among other things, move a cursor symbol on the display screen (see FIG. 2), and may use the keyboard 111 to, among other things, input textual data.

The processor 104 may be any one of numerous known general-purpose microprocessors or an application specific processor that operates in response to program instructions. In the depicted embodiment, the processor 104 includes on-board RAM (random access memory) 103, and on-board ROM (read only memory) 105. The program instructions that control the processor 104 may be stored in either or both the RAM 103 and the ROM 105. For example, the operating system software may be stored in the ROM 105, whereas various operating mode software routines and various operational parameters may be stored in the RAM 103. It will be appreciated that this is merely exemplary of one scheme for storing operating system software and software routines, and that various other storage schemes may be implemented. It will also be appreciated that the processor 104 may be implemented using various other circuits, not just a programmable processor. For example, digital logic circuits and analog signal processing circuits could also be used.

No matter how the processor 104 is specifically implemented, it is in operable communication with the terrain databases 106, the navigation databases 108, and the display device 116, and is coupled to receive various types of inertial data from the various sensors 112, and various other avionics-related data from the external data sources 114. The processor 104 is configured, in response to the inertial data and the avionics-related data, to selectively retrieve terrain data from one or more of the terrain databases 106 and navigation data from one or more of the navigation databases 108, and to supply appropriate display commands to the display device 116. The display device 116, in response to the display commands, selectively renders various types of textual, graphic, and/or iconic information. The preferred manner in which the textual, graphic, and/or iconic information are rendered by the display device 116 will be described in more detail further below. Before doing so, however, a brief description of the databases 106, 108, the sensors 112, and the external data sources 114, at least in the depicted embodiment, will be provided.

The terrain databases 106 include various types of data representative of the terrain over which the aircraft is flying, and the navigation databases 108 include various types of navigation-related data. These navigation-related data include various flight plan related data such as, for example, waypoints, distances between waypoints, headings between waypoints, data related to different airports, navigational aids, obstructions, special use airspace, political boundaries, communication frequencies, and aircraft approach information. It will be appreciated that, although the terrain databases 106 and the navigation databases 108 are, for clarity and convenience, shown as being stored separate from the processor 104, all or portions of either or both of these databases 106, 108 could be loaded into the RAM 103, or integrally formed as part of the processor 104, and/or RAM 103, and/or ROM 105. The terrain databases 106 and navigation databases 108 could also be part of a device or system that is physically separate from the system 100.

The sensors 112 may be implemented using various types of inertial sensors, systems, and or subsystems, now known or developed in the future, for supplying various types of inertial data. The inertial data may also vary, but preferably include data representative of the state of the aircraft such as, for example, aircraft speed, heading, altitude, and attitude. The number and type of external data sources 114 may also vary. For example, the external systems (or subsystems) may include, for example, a terrain avoidance and warning system (TAWS), a traffic and collision avoidance system (TCAS), a runway awareness and advisory system (RAAS), a flight director, and a navigation computer, just to name a few. However, for ease of description and illustration, only an instrument landing system (ILS) receiver 118 and a global position system (GPS) receiver 122 are depicted in FIG. 1, and will now be briefly described.

As is generally known, the ILS is a radio navigation system that provides aircraft with horizontal (or localizer) and vertical (or glide slope) guidance just before and during landing and, at certain fixed points, indicates the distance to the reference point of landing on a particular runway. The system includes ground-based transmitters (not illustrated) that transmit radio frequency signals. The ILS receiver 118 receives these signals and, using known techniques, determines the glide slope deviation of the aircraft. As is generally known, the glide slope deviation represents the difference between the desired aircraft glide slope for the particular runway and the actual aircraft glide slope. The ILS receiver 118 in turn supplies data representative of the determined glide slope deviation to the processor 104.

The GPS receiver 122 is a multi-channel receiver, with each channel tuned to receive one or more of the GPS broadcast signals transmitted by the constellation of GPS satellites (not illustrated) orbiting the earth. Each GPS satellite encircles the earth two times each day, and the orbits are arranged so that at least four satellites are always within line of sight from almost anywhere on the earth. The GPS receiver 122, upon receipt of the GPS broadcast signals from at least three, and preferably four, or more of the GPS satellites, determines the distance between the GPS receiver 122 and the GPS satellites and the position of the GPS satellites. Based on these determinations, the GPS receiver 122, using a technique known as trilateration, determines, for example, aircraft position, groundspeed, and ground track angle. These data may be supplied to the processor 104, which may determine aircraft glide slope deviation therefrom. Preferably, however, the GPS receiver 122 is configured to determine, and supply data representative of, aircraft glide slope deviation to the processor 104.

The display device 116, as noted above, in response to display commands supplied from the processor 104, selectively renders various textual, graphic, and/or iconic information, and thereby supply visual feedback to the user 109. It will be appreciated that the display device 116 may be implemented using any one of numerous known display devices suitable for rendering textual, graphic, and/or iconic information in a format viewable by the user 109. Non-limiting examples of such display devices include various cathode ray tube (CRT) displays, and various flat panel displays such as various types of LCD (liquid crystal display) and TFT (thin film transistor) displays. The display device 116 may additionally be implemented as a panel mounted display, a HUD (head-up display) projection, or any one of numerous known technologies. It is additionally noted that the display device 116 may be configured as any one of numerous types of aircraft flight deck displays. For example, it may be configured as a multi-function display, a horizontal situation indicator, or a vertical situation indicator, just to name a few. In the depicted embodiment, however, the display device 116 is configured as a primary flight display (PFD).

Figure 2:
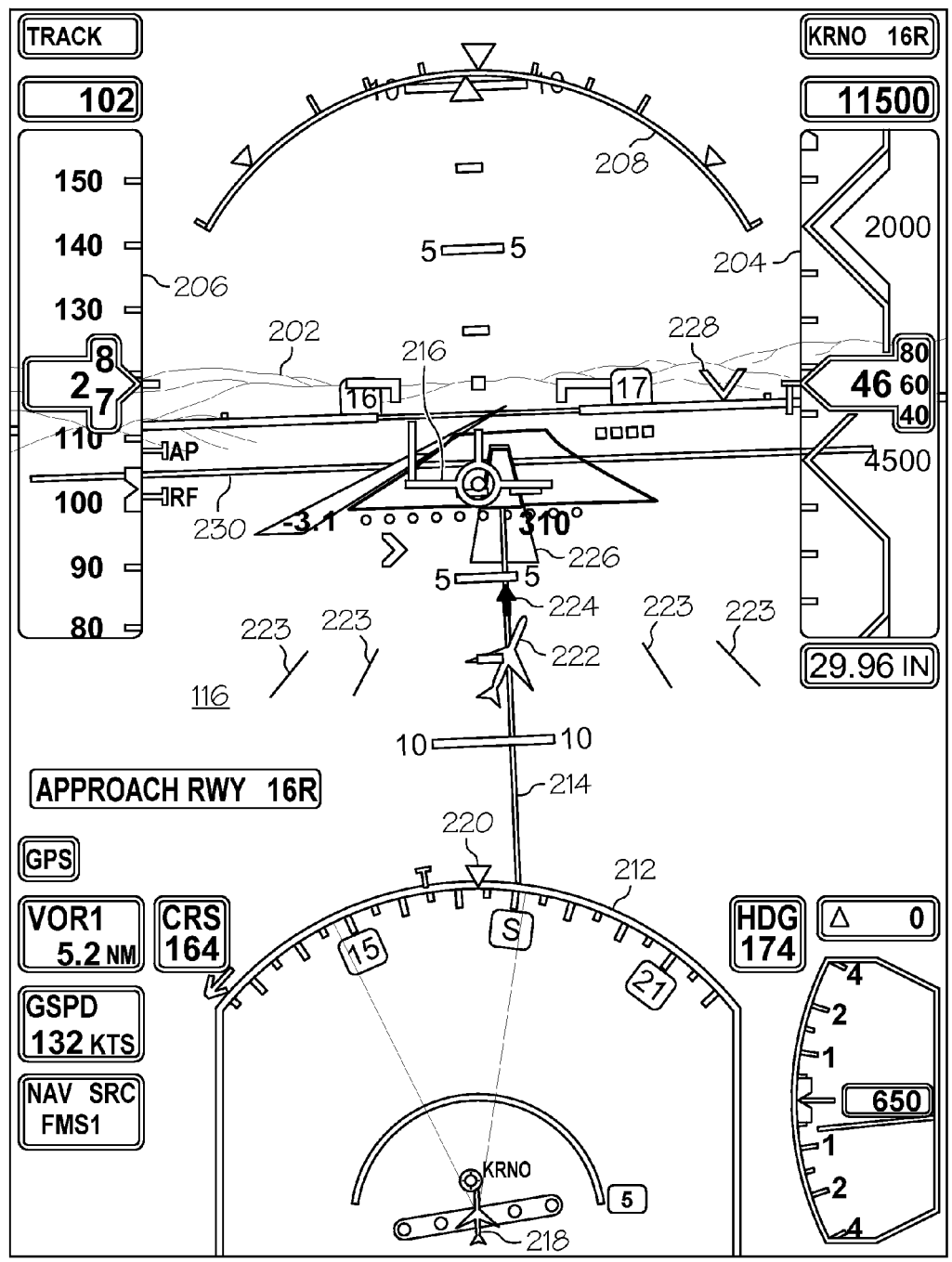
FIG. 2 is an exemplary image that may be rendered on the flight display system of FIG. 1.

Referring to FIG. 2, exemplary textual, graphical, and/or iconic information rendered by the display device 116, in response to appropriate display commands from the processor 104 is depicted. It is seen that the display device 116 renders a view of the terrain 202 ahead of the aircraft, preferably as a three-dimensional perspective view, an altitude indicator 204, an airspeed indicator 206, an attitude indicator 208, a compass 212, an extended runway centerline 214, and a flight path vector indicator 216. The heading indicator 212 includes an aircraft icon 218, and a heading marker 220 identifying the current heading (a heading of 174 degrees as shown). An additional current heading symbol 228 is disposed on the zero pitch reference line 230 to represent the current aircraft heading when the center of the forward looking display 116 is operating in a current track centered mode. The center of the forward looking display 116 represents where the aircraft is moving and the heading symbol 228 on the zero-pitch reference line 230 represent the current heading direction. The compass 212 can be shown either in heading up, or track up mode with airplane symbol 218 representing the present lateral position. Additional information (not shown) is typically provided in either graphic or numerical format representative, for example, of glide slope, altimeter setting, and navigation receiver frequencies. In addition, and as will now be described in more detail, the display device 116, at least during an approach and/or landing mode of the aircraft, also selectively renders information representative of aircraft heading/track differential (crab) to correct for crosswind effects on the aircraft.

The information used for aircraft crosswind correction includes an aircraft icon 222 and a ground track icon 224. The aircraft icon 222 is representative of the current heading direction, referenced to the current ground track 224, with the desired track as 214 for the specific runway 226 on which the aircraft is to land. The desired aircraft direction is determined, for example, by the processor 104 using data from the navigation database 108, the sensors 112, and the external data sources 114. It will be appreciated, however, that the desired aircraft direction may be determined by one or more other systems or subsystems, and from data or signals supplied from any one of numerous other systems or subsystems within, or external to, the aircraft. Regardless of the particular manner in which the desired aircraft direction is determined, the processor 104 supplies appropriate display commands to cause the display device 116 to render the aircraft icon 222 and ground track icon 224.

The ground track icon 224 is representative of the actual ground track being flown. It is desired to align the current ground track icon 224 with the desired ground track 214. Although the following numerical data is exemplary, it is given for ease of understanding the exemplary embodiment. In the depicted example, the runway 226 has a magnetic heading of 160 degrees (known in the aviation industry as runway 16) and therefore the desired ground track 214 also has a magnetic direction of 160 degrees. However, the current heading of the aircraft is 174 degrees, as illustrated by the heading indicator 220 and current heading symbol 228. Due to a crosswind, the aircraft is being blown to the left and is flying the ground track indicated by the ground track icon 224. Before actual landing on the runway, a pilot must be fully aware the extent of the crabbing and make correction to the aircraft heading directions to align with the ground track direction going to the runway.

Figure 3:
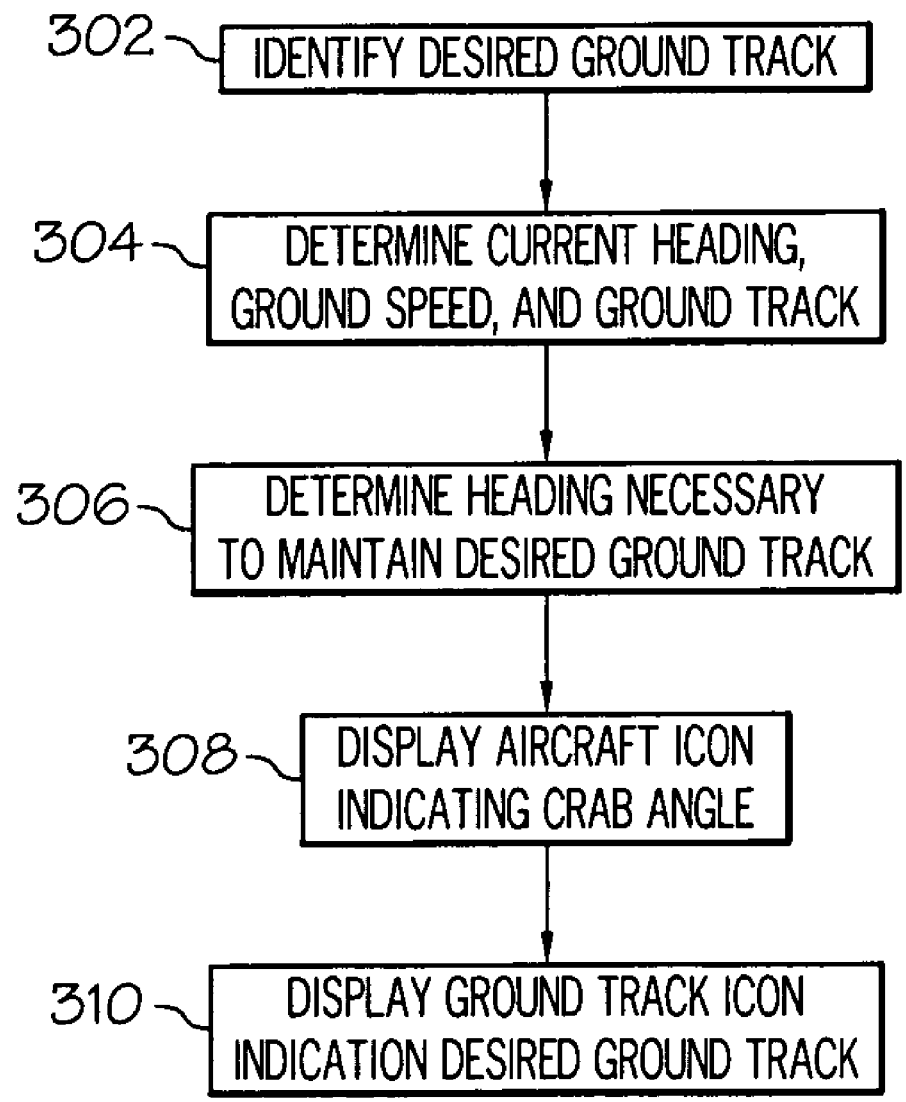
FIG. 3 is a flow chart of the steps of the exemplary embodiment.

The steps to determine the direction the aircraft icon 222 is pointing are shown in FIG. 3. The actual ground track 214 desired is identified 302 and the current heading, ground speed, and ground track are determined 304. The heading necessary to maintain the desired ground track is determined 306. The aircraft icon 222 is displayed 308 in a direction proportional to the difference between the current ground track and the current heading direction. A gain factor may be used to amplify this rotation angle to highlight the crab angle for various conditions. This gain factor allows flight crews to quickly identify the crab condition. Without such amplifications, a small crab angle, e.g., five degrees, while operationally significant for landing operation, will only show up as a minimal rotation for the aircraft icon 222 and airplane symbol 218. Application of this gain factor to the airplane symbol 218 within compass 212 is less desirable as this symbol represents a top down view of aircraft position. The aircraft icon 222 is shown in the forward looking space where a larger rotation can match well with the perspective view change of a forward looking icon when it is rotated. It may also be desirable to point the aircraft icon 222 to the current heading symbol 228 to graphically indicate the correlation between the two symbols.

The aircraft icon 222 may assume various shapes and colors depending on the amount of crab necessary to counteract the crosswind. For example, the aircraft icon 222 may get larger when a larger crab angle is required to maintain the desired ground track 214. Alternatively, the color of the aircraft icon 222 may vary depending on the amount of crab angle required. For example, a green color may indicate a small angle, yellow may indicate a medium angle, and red may indicate a larger angle. These formats are beneficial because a heading difference of a few degrees may not be noticeable on the aircraft icon 222 and 218. For this reason, the heading off the aircraft icon 222 may be offset from the actual desired heading to emphasize the crab conditions.

In another embodiment, the pilot may select, or adjust, the angle of the aircraft icon 222 by providing a different amplification factor to enable this display. This provides the pilot control over the visual perception he/she has when viewing the icon 222. In still another embodiment, the aircraft icon 222 and the ground track icon 224 may be displayed only when the crab conditions become of operational concern, for example, when the actual flight path has deviated from the desired flight path by a threshold distance. In yet another embodiment, the aircraft icon 222 and ground track icon 224 may be displayed in a fashion determined by aircraft dynamic characteristics or other displayed symbols.

FIG. 2 illustrates a conformal 3D perspective view provided by display 116 to a flight crew as their aircraft prepares to land at an airport runway 221 having a wind blowing from the right. For an offset approach runway, processor 130 notifies the flight crew of the existence of the crosswind by generating both the aircraft icon 222 and optionally the ground track icon 224 on display 120. In one embodiment, the desired ground track 214 and the ground track icon 224 are displayed such that they are easily discernable from each other (e.g. differing colors, line thicknesses, solid lines verses dashed lines). The aircraft icon 222 provides a suggested direction in which the pilot may maneuver the aircraft to compensate for crosswind, and in conjunction with the ground track icon 224, or lateral deviation icon 223, provides clues as to where the pilot may look for and find the runway on the approach, for example, when breaking out of weather.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims.

The invention claimed is:

1. A method of illustrating how to maneuver an aircraft to correct for crosswind, comprising:
   determining a difference between a current ground track and a current heading;
   identifying a desired ground track;
   calculating, in response to the determining and identifying steps, a desired heading required to maintain the desired ground track;
   applying a gain factor to the desired heading resulting in a modified heading proportional to the difference between current track and desired heading; and
   rendering on a display the current ground track, current heading, and an aircraft icon that is representative of the modified heading, the aircraft icon having a format different from the current ground track.

2. The method of claim 1 wherein the rendering step comprises rendering the aircraft icon comprising one of a plurality of formats as determined by the magnitude of the difference between the current track and the desired heading.

3. The method of claim 2 wherein the rendering step comprises rendering the aircraft icon comprising a format selected from one of the formats consisting of at least two colors and at least two sizes.

4. The method of claim 1 wherein the rendering step comprises a user selecting the conditions to enable the aircraft icon that is representative of the modified heading.

5. The method of claim 1 wherein rendering step comprises rendering the aircraft icon comprising displaying the modified heading as determined by aircraft dynamic characteristics.

6. The method of claim 1 wherein the rendering step comprises displaying the aircraft icon with respect to the desired ground track as determined by one of an ILS navigation aid, a ground based navigational system, a GPS navigation aid, a flight management system, and an inertial navigation system.

7. The method of claim 1 further comprising rendering a lateral deviation icon for indicating angular deviations form a desired course line.

8. The method of claim 1 further comprising rendering a lateral deviation icon indicating linear deviations from the desired ground track.

9. The method of claim 7 wherein the rendering a lateral deviation step comprises rendering a lateral deviation icon comprising one of a plurality of formats as determined by the magnitude of the desired heading.

10. The method of claim 9 wherein the rendering a lateral deviation step comprises rendering the aircraft icon comprising a format selected from one of the formats consisting of at least two colors, at least two sizes, and at least two positions.

11. The method of claim 1 further comprising rendering a lateral deviation icon indicating the direction in which a runway is positioned in relation to a heading indicated by the aircraft icon.

12. A method of displaying an icon representative of a desired aircraft crab angle to compensate for a crosswind, comprising:
   determining a current ground track;
   determining a current heading;
   determining a difference between the current ground track and the current heading;
   determining a desired ground track;
   determining, in response to the desired ground track and difference between the current ground track and the current heading, a desired heading reflective of the desired aircraft crab angle required to maintain the desired ground track;
   applying a gain factor to the desired heading resulting in a modified heading when the difference between the desired heading and the desired ground track is less than a threshold; and
   rendering on a display an aircraft icon that is representative of the modified heading, the aircraft icon having a format different than a displayed desired ground track.

13. The method of claim 12 wherein the rendering step comprises rendering the aircraft icon comprising one of a plurality of formats as determined by the magnitude of the desired heading.

14. The method of claim 12 wherein the rendering step comprises rendering the aircraft icon comprising a format selected from one of the formats consisting of at least two colors and at least two sizes.

15. The method of claim 12 further comprising rendering a lateral deviation icon for indicating angular deviations form a desired course line.

16. The method of claim 14 wherein the rendering a lateral deviation icon step comprises rendering a lateral deviation icon comprising one of a plurality of formats as determined by the magnitude of the desired heading.

17. An aircraft display system comprising:
   a processor adapted to receive data representative of a desired ground track, a current heading and data representative of a current ground track deviation, and configured upon receipt of these data to determine a desired heading required to maintain the desired ground track, and to apply a gain factor to the desired heading resulting in a modified heading when the difference between the desired heading and the desired ground track is less than a threshold, and supply a ground track rendering display command and a modified heading display command; and
   a display device coupled to receive the ground track image rendering display command and the modified heading display command and operable to render an icon representative of the modified heading to maintain the desired ground track.

* * * * *